US012786557B2

(12) United States Patent
Hashimoto

(10) Patent No.: US 12,786,557 B2
(45) Date of Patent: Nov. 3, 2026

(54) CAMERA CONTROL DEVICE, CAMERA CONTROL METHOD, AND NON-TRANSITORY RECORDING MEDIUM

(71) Applicant: TOYOTA JIDOSHA KABUSHIKI KAISHA, Aichi-ken (JP)

(72) Inventor: Kouhei Hashimoto, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 49 days.

(21) Appl. No.: 18/959,608

(22) Filed: Nov. 26, 2024

(65) Prior Publication Data

US 2025/0184602 A1 Jun. 5, 2025

(30) Foreign Application Priority Data

Dec. 1, 2023 (JP) ................................ 2023-204078

(51) Int. Cl.

| | |
|---|---|
| ***H04N 23/65*** | (2023.01) |
| ***B60R 1/00*** | (2022.01) |
| ***B60R 11/04*** | (2006.01) |
| ***B60W 30/00*** | (2006.01) |

(52) U.S. Cl.

CPC ........... *H04N 23/651* (2023.01); *B60R 11/04* (2013.01)

(58) Field of Classification Search

CPC ...... H04N 23/65; H04N 23/651; B60R 11/04; B60R 1/00; B60W 30/00

See application file for complete search history.

(56) References Cited

U.S. PATENT DOCUMENTS

| | | | | |
|---|---|---|---|---|
| 10,427,689 | B2 | 10/2019 | Tokimasa et al. | |
| 10,486,698 | B2 | 11/2019 | Masui et al. | |
| 10,731,996 | B2 | 8/2020 | Naito | |
| 10,922,561 | B2 | 2/2021 | Ozawa et al. | |
| 11,017,247 | B2 | 5/2021 | Hayashi et al. | |
| 11,072,328 | B2 | 7/2021 | Masui et al. | |
| 11,235,766 | B2 | 2/2022 | Masui et al. | |
| 11,247,671 | B2 | 2/2022 | Komori | |
| 11,691,518 | B2 * | 7/2023 | Koda | B60R 25/31 |
| 2006/0092278 | A1 * | 5/2006 | Kondo | B60R 25/102 348/152 |
| 2013/0063607 | A1 | 3/2013 | Shimotono et al. | |
| 2017/0256040 | A1 * | 9/2017 | Grauer | H04N 23/631 |
| 2020/0047748 | A1 * | 2/2020 | Komori | B60W 30/09 |
| 2020/0326191 | A1 | 10/2020 | Naito | |
| 2021/0364631 | A1 | 11/2021 | Hasegawa et al. | |

FOREIGN PATENT DOCUMENTS

| | | |
|---|---|---|
| JP | 2000-207696 A | 7/2000 |
| JP | 2013-058961 A | 3/2013 |

* cited by examiner

*Primary Examiner* — Marly S Camargo

(74) *Attorney, Agent, or Firm* — HAUPTMAN HAM, LLP

(57) ABSTRACT

A camera control device includes a control unit shooting by using a camera when a first condition is satisfied, the control unit switches a power supply of the camera from OFF to ON when a second condition which differs from the first condition is satisfied, when the second condition is satisfied is when it is predicted that it becomes a scene in which the camera is used.

6 Claims, 4 Drawing Sheets

CAMERA CONTROL DEVICE, CAMERA CONTROL METHOD, AND NON-TRANSITORY RECORDING MEDIUM

RELATED APPLICATIONS

The present application claims priority to Japanese Patent Application No. 2023-204078, filed Dec. 1, 2023, the disclosure of which is hereby incorporated by reference herein in its entirety.

FIELD

The present disclosure relates to camera control device, camera control method, and non-transitory recording medium.

BACKGROUND

PTL 1 (Japanese Unexamined Patent Publication No. 2013-058961) describes a camera system for transferring image data while reducing power consumption. In the technique described in PTL 1, the camera system is realized by a note PC, a camera module which is a USB device is incorporated into a housing of the note PC or is connected to a USB connecter of the housing of the note PC.

A general camera module, such as the camera module described in PTL 1, for example, can be put in a suspended state (a state in which the system is paused) when it does not transfer image data.

On the other hand, it is not described in PTL 1 what kind of control should be performed to reduce the power consumption of the camera when the camera module in the suspended state is wakened up. Therefore, in the technique described in PTL 1, there is a possibility that it is impossible to appropriately switch a power supply of the camera from OFF to ON while reducing the power consumption of the camera.

In a general on-board camera, video acquisition (shooting by using the camera) and video data transmission to a host device (for example, an ADU (ADAS (Advanced driver-assistance systems) Domain Unit), MM (multimedia) system as shown in FIG. 2 or the like) is performed after the camera startup sequence is completed after a vehicle power supply is turned ON (the camera is turned on). However, in the general on-board camera, video processing is constantly performed (in detail, the camera acquires the video and transmits the video data, the host device receives the video data and performs image processing) regardless of whether or not driving assistance for a driver of the vehicle is being implemented. In other words, on-board power is consumed more than necessary and more computing resource of the host device is used than necessary.

In the general on-board camera, when the driver of the vehicle requires a camera image to be displayed, it is necessary to switch a display screen from, for example, the display screen of a navigation system or the like to the display screen of the camera image within a specified time. Therefore, the camera cannot be put in the suspended state as necessary. In addition, in the general on-board camera, since the camera image is constantly transmitted to the host device described above, the camera cannot be put in the suspend state as necessary. If the camera is put in the suspended state, it is necessary to ensure that the responsiveness of the switching of the display screen is not hindered because a certain amount of time is required for the camera to get from the suspended state to a resume condition (steady state).

In a driving assistance function in which image recognition (detection) using the camera image is performed, it is necessary to execute a recognition process before the driver of the vehicle requests the execution of the driving assistance. Therefore, the camera image is always transmitted to the host device described above. Accordingly, in the general on-board camera used for the driving assistance, the camera cannot be put in the suspend state as necessary. If the camera is put in the suspended state, it is necessary to ensure that the responsiveness of the start of the driving assistance is not hindered because the certain amount of time is required for the camera to get from the suspend state to the resume condition (steady state) as described above.

SUMMARY

In view of the above-mentioned points, it is an object of the present disclosure to provide camera control device, camera control method, and non-transitory recording medium that can appropriately switch a power supply of a camera from OFF to ON while reducing power consumption of the camera.

(1) One aspect of the present disclosure is a camera control device including a processor configured to: shoot by using a camera when a first condition is satisfied; and switch a power supply of the camera from OFF to ON when a second condition which differs from the first condition is satisfied, wherein when the second condition is satisfied is when it is predicted that it becomes a scene in which the camera is used.

(2) In the camera control device of the aspect (1), the processor may be configured to switch the power supply of the camera from ON to OFF when a third condition which differs from the first condition and the second condition is satisfied, when the third condition is satisfied is when it is predicted that it is no longer the scene in which the camera is used.

(3) In the camera control device of the aspect (2), the camera and the camera control device may be mounted on a vehicle, a threshold value of vehicle speed for satisfying the second condition may be greater than the threshold value of the vehicle speed for satisfying the first condition and less than the threshold value of the vehicle speed for satisfying the third condition.

(4) Another aspect of the present disclosure is a camera control method including: shooting by using a camera when a first condition is satisfied; and switching a power supply of the camera from OFF to ON when a second condition which differs from the first condition is satisfied, wherein when the second condition is satisfied is when it is predicted that it becomes a scene in which the camera is used.

(5) Another aspect of the present disclosure is a non-transitory recording medium having recorded thereon a computer program for causing a processor to execute a process including: shooting by using a camera when a first condition is satisfied; and switching a power supply of the camera from OFF to ON when a second condition which differs from the first condition is satisfied, wherein when the second condition is satisfied is when it is predicted that it becomes a scene in which the camera is used.

According to the present disclosure, it is possible to appropriately switch a power supply of a camera from OFF to ON while reducing power consumption of the camera.

DESCRIPTION OF EMBODIMENTS

Figure 1:
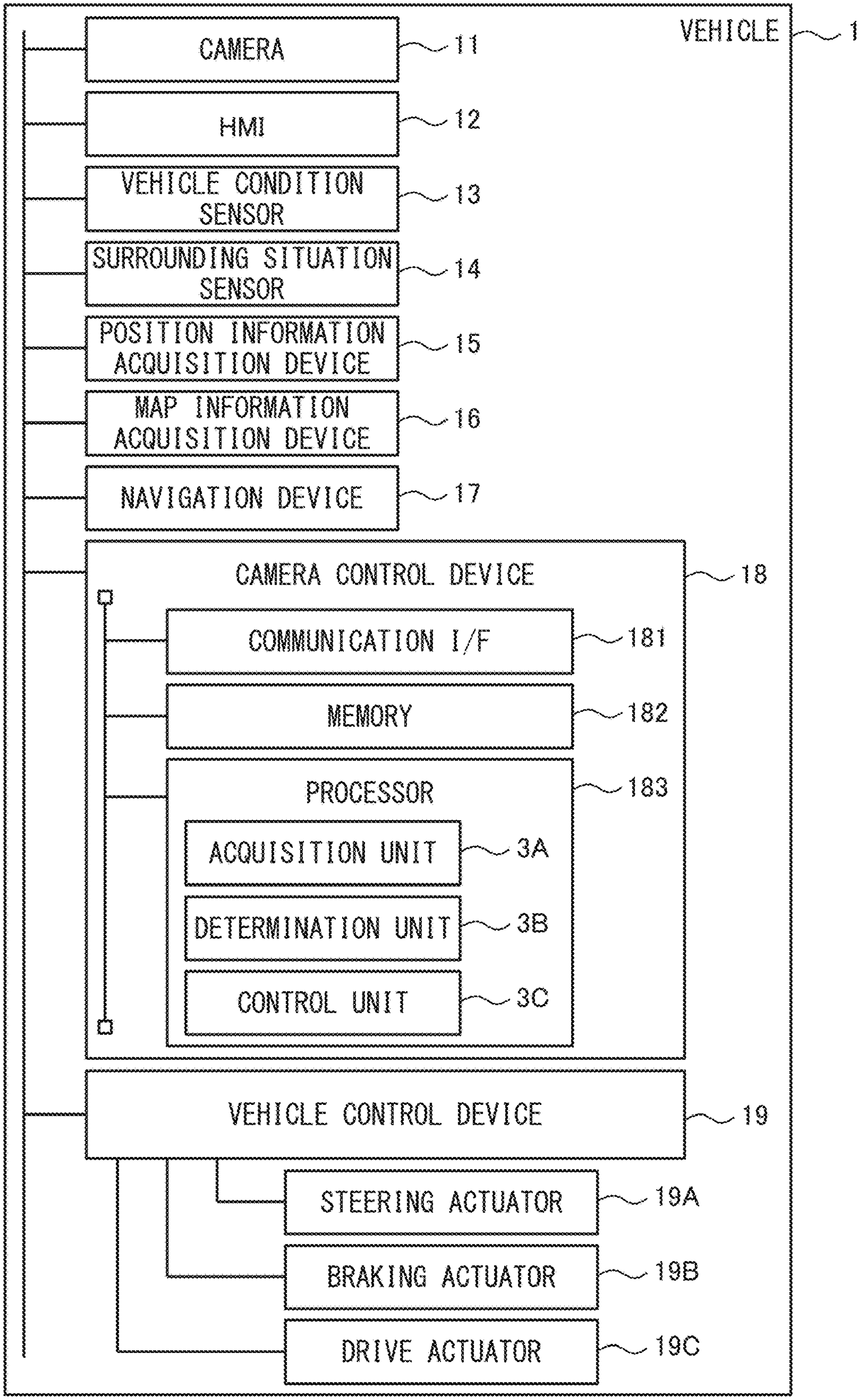
FIG. 1 is a view showing an example of a vehicle 1 to which a camera control device 18 of a first embodiment is applied.

Below, referring to the drawings, embodiments of camera control device, camera control method, and non-transitory recording medium of the present disclosure will be explained.

First Embodiment

Figure 2:
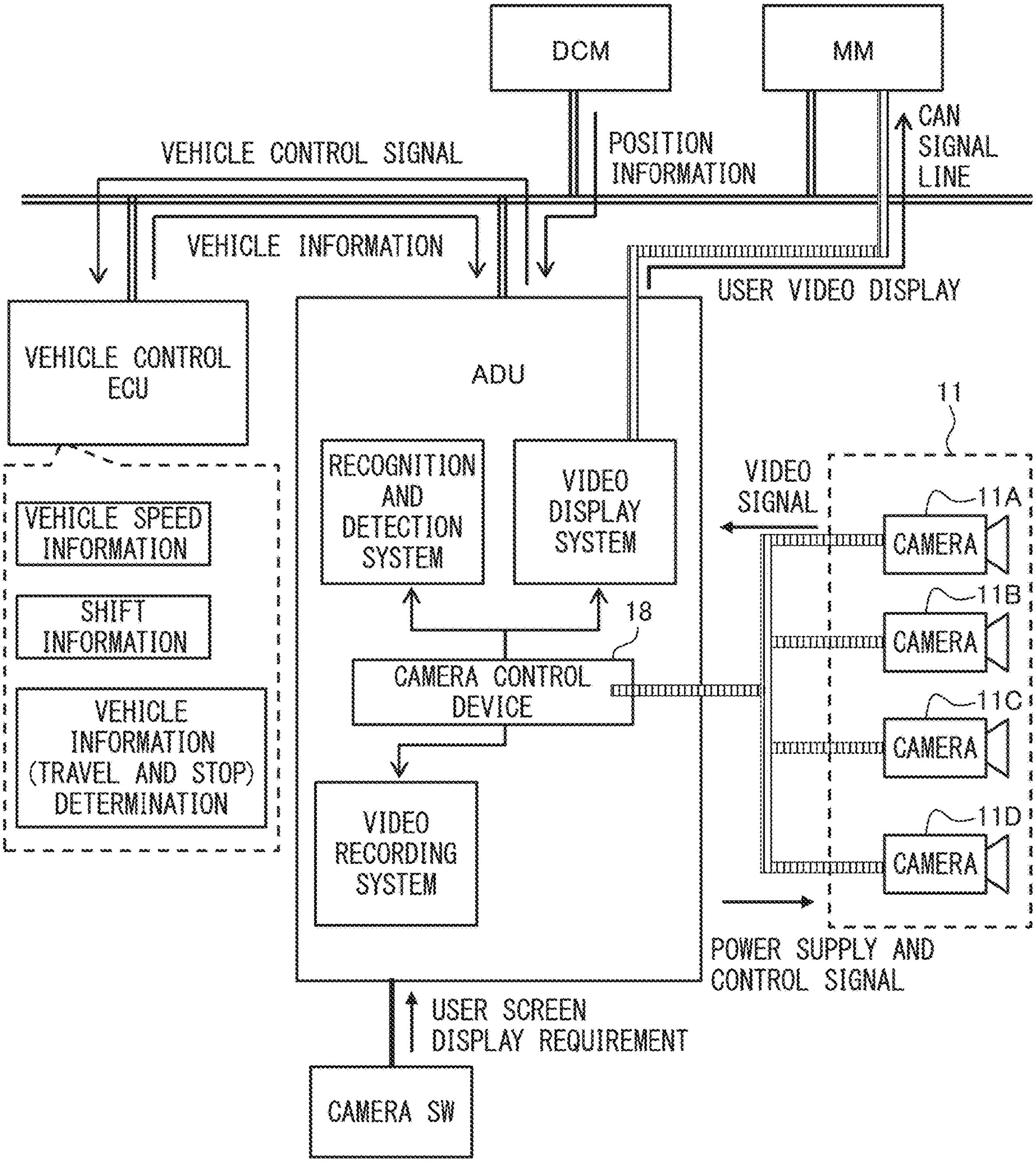
FIG. 2 is a view showing an example of a specific configuration for realizing the vehicle 1 shown in FIG. 1.

FIG. 1 is a view showing an example of a vehicle 1 to which a camera control device 18 of a first embodiment is applied. FIG. 2 is a view showing an example of a specific configuration for realizing the vehicle 1 shown in FIG. 1.

In an example shown in FIG. 1, the vehicle 1 includes a camera 11, an HMI (Human Machine Interface) 12, a vehicle condition sensor 13, a surrounding situation sensor 14, a position information acquisition device 15, a map information acquisition device 16, a navigation device 17, the camera control device 18, a vehicle control device 19, a steering actuator 19A, a braking actuator 19B, and a drive actuator 19C.

The camera 11, for example, shoots the outside and the like of the vehicle 1, and transmits a video signal to the camera control device 18, the vehicle control device 19 and the like. In the example shown in FIG. 2, a camera 11A for shooting the rear of the vehicle 1, a camera 11B for shooting the front of the vehicle 1, a camera 11C for shooting the left of the vehicle 1, and a camera 11D for shooting the right of the vehicle 1 are included in the camera 11.

In the example shown in FIG. 1, the HMI 12 has a function of receiving various type of operations of a driver of the vehicle 1 and transmits signals indicating the operations of the driver of the vehicle 1 to the camera control device 18, the vehicle control device 19 and the like. The HMI 12 includes a shift lever used in a first camera usage scene to be described later, a camera switch (SW) (see FIG. 2) used in a second camera usage scene to be described later, an automatic display button used for switching ON/OFF of an automatic display mode in a third camera usage scene to be described later, multimedia (MM) (see FIG. 2) for receiving point registration in a fourth camera usage scene to be described later, an advanced park switch used in a seventh camera usage scene to be described later, a steering (and a steering angle sensor), a brake pedal (and a sensor for detecting the operation amount), an accelerator pedal (and a sensor for detecting the operation amount) and the like.

The vehicle condition sensor 13 detects condition of the vehicle 1 and transmits the detection result to the camera control device 18, the vehicle control device 19 and the like. The vehicle condition sensor 13 includes a shift sensor used in the first camera usage scene or the like, a vehicle speed sensor and the like.

The surrounding situation sensor 14 detects a target (e.g., an obstacle, a surrounding vehicle, a pedestrian, etc.) existing in the vicinity of the vehicle 1 and transmits the detection result to the camera control device 18, the vehicle control device 19 and the like. The surrounding situation sensor 14 includes a clearance sonar and the like used in a fifth camera usage scene described below.

The position information acquisition device 15 acquires information indicating the position of the vehicle 1. The position information acquisition device 15 includes, for example, a GPS (Global Positioning System) device and the like that measures the position of the vehicle 1. The position information acquisition device 15 may perform a well-known self-position estimation process (localization) and may increase the accuracy of the information indicating the position of the vehicle 1. The position information acquisition device 15 transmits the information indicating the position of the vehicle 1 to the navigation device 17, the camera control device 18, the vehicle control device 19 and the like. In an example shown in FIG. 2, the position information acquisition device 15 acquires the information indicating the position of the vehicle 1 from a DCM (Data Communication Module).

In the example shown in FIG. 1, the map information acquisition device 16 acquires map information from a map database and transmits the map information to the navigation device 17 and the like. The map database may be stored in a storage device (not shown) mounted on the vehicle 1 or may be stored in a management server outside the vehicle 1. In an example in which the map database is stored in the management server outside the vehicle 1, the map information acquisition device 16 acquires the map information from the map database through communication between the vehicle 1 and the management server.

The navigation device 17 guides the driver of the vehicle 1 to a destination set by the driver of the vehicle 1. The navigation device 17 calculates a target route to the destination based on the position information of the vehicle 1 acquired by the position information acquisition device 15 and the map information acquired by the map information acquisition device 16 and presents navigation information about the target route to the driver of the vehicle 1 through the HMI 12 (the MM in the example shown in FIG. 2).

The vehicle control device 19 is constituted by, for example, a vehicle control ECU (Electronic Control Unit) (see FIG. 2). The vehicle control device 19 controls the steering actuator 19A, the braking actuator 19B, and the drive actuator 19C based on, for example, information (signals) transmitted from the camera 11, the HMI 12, the vehicle condition sensor 13, the surrounding situation sensor 14 and the like. The drive actuator 19C includes, for example, engine, EV (electric vehicle) system, hybrid system, fuel cell system and the like.

The camera control device 18 is constituted by a microcomputer including communication interface (I/F) 181, memory 182 and processor 183. The communication interface 181 includes an interface circuit for connecting the camera control device 18 to the camera 11, the HMI 12, the vehicle condition sensor 13, the surrounding situation sensor 14, the position information acquisition device 15, the map information acquisition device 16, the navigation device 17, the vehicle control device 19 and the like. The memory 182 stores programs used in processes performed by the processor 183 and various data. The processor 183 has function as an acquisition unit 3A, function as a determination unit 3B, and function as a control unit 3C.

The acquisition unit 3A acquires the video signal from the camera 11. The acquisition unit 3A acquires the signals indicating the operations (for example, a shift lever operation, a camera switch operation (an operation for requesting a screen display of video shot by the camera 11), an automatic display button operation for switching ON/OFF of the automatic display mode, a point registration operation, an advanced park switch operation (an operation in which the driver of the vehicle 1 causes vehicle control device 19 to control the steering actuator 19A, the braking actuator 19B, and the drive actuator 19C and perform automatic parking without requiring the driver of the vehicle 1 to perform steering operation, brake pedal operation and the accelerator pedal operation) and the like) of the driver of the vehicle 1 received by the HMI 12. Furthermore, the acquisition unit 3A acquires the detection result (for example, shift position (R position, P position, etc.), the vehicle speed, etc.) of the vehicle condition sensor 13, the detection result (for example, information indicating whether the pedestrian exists behind the vehicle 1, etc.) of the surrounding situation sensor 14.

The determination unit 3B performs a determination of whether an operation condition of the first camera usage scene (first condition) is satisfied. The control unit 3C controls the camera 11 based on the result of the determination performed by the determination unit 3B.

In the first camera usage scene, when the driver of the vehicle 1 performs the shift lever operation to set the shift position to the R position in a state in which an engine switch is ON in an example in which the drive actuator 19C is the engine (a power switch is ON in another example in which the drive actuator 19C is the EV system, the hybrid system or the fuel cell system), a screen of a back guide monitor including the video of the rear of the vehicle 1 shot by the camera 11A or the like is displayed by the HMI 12 (the MM in the example shown in FIG. 2).

In the first camera usage scene, the determination unit 3B performs the determination of whether the operation condition of the camera 11 of the first camera usage scene (the first condition) is satisfied, that is, the determination of whether the shift lever is positioned in the R position. When the operation condition of the camera 11 of the first camera usage scene is satisfied, the control unit 3C shoots by using the camera 11. In the example shown in FIG. 2, the control unit 3C activates an application for displaying the video shoot by the camera 11 on the MM and transmits the video shoot by the camera 11 to the MM through a video display system.

The determination unit 3B performs the determination of whether a resume condition of the camera 11 of the first camera usage scene (second condition) is satisfied, in detail, the determination of whether the vehicle speed of the vehicle 1 is less than, for example, 5 km/h. When the resume condition of the camera 11 of the first camera usage scene is satisfied, the control unit 3C switches the power supply of the camera 11 from OFF to ON. When the resume condition of the camera 11 of the first camera usage scene is satisfied is when it is predicted that it becomes the first camera usage scene.

The determination unit 3B performs the determination of whether a suspend condition of the camera 11 of the first camera usage scene (third condition) is satisfied, in detail, the determination of whether the vehicle speed of the vehicle 1 is, for example, 10 km/h or more. When the suspend condition of the camera 11 of the first camera usage scene is satisfied, the control unit 3C switches the power supply of the camera 11 from ON to OFF. When the suspend condition of the camera 11 of the first camera usage scene is satisfied is when it is predicted that it is no longer the first camera usage scene.

Figure 3:
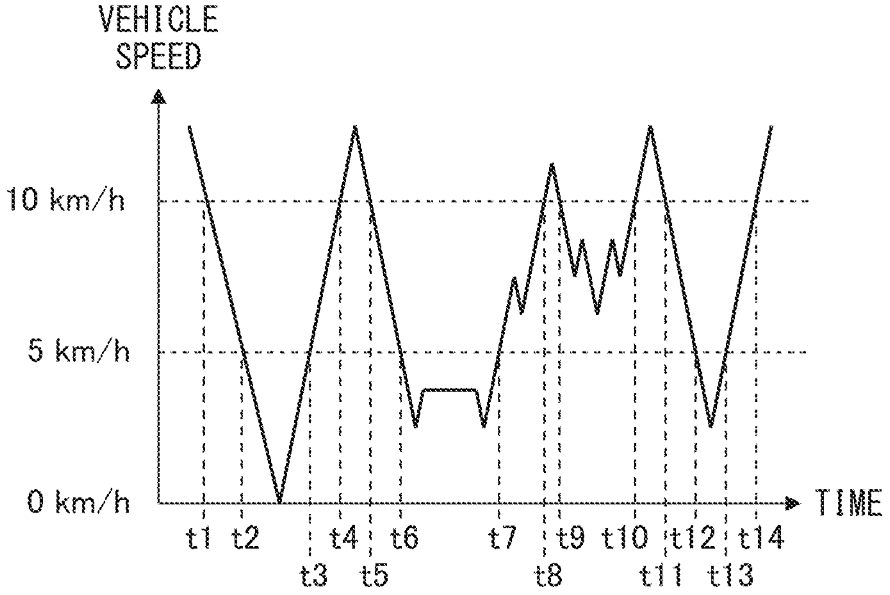
FIG. 3 is a view for explaining an example of a relationship between change in vehicle speed of the vehicle 1 over time and a determination result of a determination unit 3B.

FIG. 3 is a view for explaining an example of a relationship between change in the vehicle speed of the vehicle 1 over time and a determination result of the determination unit 3B.

In the example shown in FIG. 3, since the vehicle speed of the vehicle 1 is 10 km/h or more during the period before time t1, the determination unit 3B determines that the suspend condition of the camera 11 of the first camera usage scene is satisfied, the power supply of the camera 11 is switched from ON to OFF by the control unit 3C.

During the period from time t1 to time t2, since the vehicle speed of the vehicle 1 is between 5 km/h and 10 km/h, the determination unit 3B determines that the suspend condition of the camera 11 of the first camera usage scene is not satisfied and the resume condition of the camera 11 of the first camera usage scene is not satisfied, the control unit 3C maintains the power supply of the camera 11 in an OFF condition.

During the period from time t2 to time t3, since the vehicle speed of the vehicle 1 is less than 5 km/h, the determination unit 3B determines that the resume condition of the camera 11 of the first camera usage scene is satisfied, the power supply of the camera 11 is switched from OFF to ON by the control unit 3C.

During the period from time t3 to time t4, since the vehicle speed of the vehicle 1 is between 5 km/h and 10 km/h, the determination unit 3B determines that the resume condition of the camera 11 of the first camera usage scene is not satisfied and the suspend condition of the camera 11 of the first camera usage scene is not satisfied, the control unit 3C maintains the power supply of the camera 11 in an ON condition.

During the period from time t4 to time t5, since the vehicle speed of the vehicle 1 is 10 km/h or more, the determination unit 3B determines that the suspend condition of the camera 11 of the first camera usage scene is satisfied, the power supply of the camera 11 is switched from ON to OFF by the control unit 3C.

During the period from time t5 to time t6, the same determination and control as during the period from time t1 to time t2 is performed. During the period from time t6 to time t7, the same determination and control as during the period from time t2 to time t3 is performed. During the period from time t7 to time t8, the same determination and control as during the period from time t3 to time t4 is performed. During the period from time t8 to time t9, the same determination and control as during the period from time t4 to time t5 is performed.

During the period from time t9 to time t10, since the vehicle speed of the vehicle 1 is between 5 km/h and 10 km/h, the determination unit 3B determines that the suspend condition of the camera 11 of the first camera usage scene is not satisfied and the resume condition of the camera 11 of the first camera usage scene is not satisfied, the control unit 3C maintains the power supply of the camera 11 in the OFF condition.

During the period from time t10 to time t11, the same determination and control as during the period from time t4 to time t5 is performed. During the period from time t11 to time t12, the same determination and control as during the period from time t1 to time t2 is performed. During the period from time t12 to time t13, the same determination and control as during the period from time t2 to time t3 is performed. During the period from time t13 to time t14, the same determination and control as during the period from time t3 to time t4 is performed. During the period after time t14, the same determination and control as during the period from time t4 to time t5 is performed.

In the example shown in FIG. 3, since the shift lever is not positioned in the R position, the determination unit 3B continues to determine that the operation condition of the camera 11 of the first camera usage scene is not satisfied, the control unit 3C does not shoot by using the camera 11.

Further, in the example shown in FIG. 3, since the hysteresis is provided, it is possible to suppress that the ON condition and the OFF condition of the power supply of the camera 11 are switched frequently.

In the example shown in FIG. 1, the determination unit 3B performs the determination of whether the operation condition of a second camera usage scene is satisfied.

In the second camera usage scene, when the driver of the vehicle 1 presses the camera switch in the state in which the engine switch (or the power switch) is ON, the video such as a panoramic view or the like generated by the video display system (see FIG. 2) synthesizing the video shot by the camera 11A to camera 11D is displayed on the MM (see FIG. 2) in accordance with the position of the shift lever.

In the second camera usage scene, the determination unit 3B performs the determination of whether the operation condition of the camera 11 of the second camera usage scene is satisfied, more particularly, the determination of whether the camera switch is pressed, the shift lever is positioned at a position other than the R position, and the vehicle speed of the vehicle 1 is, for example, 12 (20) km/h or less. When the operation condition of the camera 11 of the second camera usage scene is satisfied, the control unit 3C shoots by using the camera 11.

The determination unit 3B performs the determination of whether the resume condition of the camera 11 of the second camera usage scene is satisfied, more particularly, the determination of whether the vehicle speed of the vehicle 1 is less than, for example, 25 km/h. When the resume condition of the camera 11 of the second camera usage scene is satisfied, the control unit 3C switches the power supply of the camera 11 from OFF to ON. When the resume condition of the camera 11 of the second camera usage scene is satisfied is when it is predicted that it becomes the second camera usage scene.

In addition, the determination unit 3B performs the determination of whether the suspend condition of the camera 11 of the second camera usage scene is satisfied, in particular, the determination of whether the vehicle speed of the vehicle 1 is, for example, 30 km/h or more. When the suspend condition of the camera 11 of the second camera usage scene is satisfied, the control unit 3C switches the power supply of the camera 11 from ON to OFF. When the suspension condition of the camera 11 of the second camera usage scene is satisfied is when it is predicted that it is no longer the second camera usage scene.

In the second camera usage scene, a threshold value (25 km/h) of the vehicle speed for satisfying the resume condition is greater than the threshold value (12 (20) km/h) of the vehicle speed for satisfying the operation condition and less than the threshold value (30 km/h) of the vehicle speed for satisfying the suspend condition.

The determination unit 3B performs the determination of whether the operation condition of a third camera usage scene is satisfied.

In the third camera usage scene, when the driver of the vehicle 1 touches the automatic display button and the automatic display mode is in an ON condition, the video such as the panoramic view or the like is automatically displayed on the MM (see FIG. 2) according to the position of the shift lever and the vehicle speed of the vehicle 1.

In the third camera usage scene, the determination unit 3B performs the determination of whether the operation condition of the camera 11 of the third camera usage scene is satisfied, in particular, the determination of whether the automatic display mode is in the ON condition, the vehicle speed of the vehicle 1 is in a condition in which the vehicle speed of the vehicle 1 changes (decelerates) from, for example, more than 10 km/h to 10 km/h or less, and the shift lever is positioned in a position other than the P position and the R position. When the operation condition of the camera 11 of the third camera usage scene is satisfied, the control unit 3C shoots by using the camera 11.

The determination unit 3B performs the determination of whether the resume condition of the camera 11 of the third camera usage scene is satisfied, in particular, the determination of whether the automatic display mode is in the ON condition and the vehicle speed of the vehicle 1 is less than, for example, 15 km/h. When the resume condition of the camera 11 of the third camera usage scene is satisfied, the control unit 3C switches the power supply of the camera 11 from OFF to ON. When the resume condition of the camera 11 of the third camera usage scene is satisfied is when it is predicted that it becomes the third camera usage scene.

In addition, the determination unit 3B performs the determination of whether the suspend condition of the camera 11 of the third camera usage scene is satisfied, in particular, the determination of whether the automatic display mode is in the OFF condition or the vehicle speed of the vehicle 1 is, for example, 20 km/h or more. When the suspend condition of the camera 11 of the third camera usage scene is satisfied, the control unit 3C switches the power supply of the camera 11 from ON to OFF. When the suspend condition of the camera 11 of the third camera usage scene is satisfied is when it is predicted that it is no longer the third camera usage scene.

In the third camera usage scene, the threshold value (15 km/h) of the vehicle speed for satisfying the resume condition is greater than the threshold value (10 km/h) of the vehicle speed for satisfying the operation condition and less than the threshold value (20 km/h) of the vehicle speed for satisfying the suspend condition.

Furthermore, the determination unit 3B performs the determination of whether the operation condition of the fourth camera usage scene is satisfied.

In the fourth camera usage scene, the video such as the panoramic view or the like is automatically displayed on the MM (see FIG. 2) when the position of the vehicle 1 reaches the vicinity of a pre-registered point which is pre-registered by using a point registration switch, the position of the vehicle 1 is linked to information indicating the position of the vehicle 1 acquired by the position information acquisition device 15.

In the fourth camera usage scene, the determination unit 3B performs the determination of whether the operation condition of the camera 11 of the fourth camera usage scene is satisfied, in particular, the determination of whether the vehicle 1 is located within an area (a registered point area) near the registered point, the vehicle speed of the vehicle 1 is, for example, 10 km/h or less, and the shift lever is positioned in the position other than the P position and the R position. When the operation condition of the camera 11 of the fourth camera usage scene is satisfied, the control unit 3C shoots by using the camera 11.

The determination unit 3B performs the determination of whether the resume condition of the camera 11 of the fourth camera usage scene is satisfied, in particular, the determination of whether the point registration is performed, the vehicle 1 is located near the registered point area, and the vehicle speed of the vehicle 1 is less than, for example, 15 km/h. When the resume condition of the camera 11 of the fourth camera usage scene is satisfied, the control unit 3C switches the power supply of the camera 11 from OFF to ON. When the resume condition of the camera 11 of the fourth camera usage scene is satisfied is when it is predicted that it becomes the fourth camera usage scene.

Furthermore, the determination unit 3B performs the determination of whether the suspend condition of the camera 11 of the fourth camera usage scene is satisfied, in particular, the determination of whether the point registration is not performed (for example, the registered point is erased), the vehicle 1 is located at a position which is further away from the registered point than the vicinity of the registered point area, or the vehicle speed of the vehicle 1 is, for example, 20 km/h or more. When the suspend condition of the camera 11 of the fourth camera usage scene is satisfied, the control unit 3C switches the power supply of the camera 11 from ON to OFF. When the suspension condition of the camera 11 of the fourth camera usage scene is satisfied is when it is predicted that it is no longer the fourth camera usage scene.

In the fourth camera usage scene, the threshold value (15 km/h) of the vehicle speed for satisfying the resume condition is greater than the threshold value (10 km/h) of the vehicle speed for satisfying the operation condition and less than the threshold value (20 km/h) of the vehicle speed for satisfying the suspend condition.

The determination unit 3B performs the determination of whether the operation condition of a fifth camera usage scene is satisfied.

In the fifth camera usage scene, the display of the distance to an obstacle is performed on a panoramic view monitor screen or the like in conjunction with detection of the obstacle by clearance sonar.

In the fifth camera usage scene, the determination unit 3B performs the determination of whether the operation condition of the camera 11 of the fifth camera usage scene is satisfied, in particular, the determination of whether the vehicle speed of the vehicle 1 is, for example, 10 km/h or less, the shift lever is positioned in the position other than the P position and the R position, and the obstacle is detected by the clearance sonar. When the operation condition of the camera 11 of the fifth camera usage scene is satisfied, the control unit 3C shoots by using the camera 11.

The determination unit 3B performs the determination of whether the resume condition of the camera 11 of the fifth camera usage scene is satisfied, in detail, the determination of whether the clearance sonar is in the operation condition (the ON condition) capable of detecting the obstacle and the vehicle speed of the vehicle 1 is less than, for example, 15 km/h. When the resume condition of the camera 11 of the fifth camera usage scene is satisfied, the control unit 3C switches the power supply of the camera 11 from OFF to ON. When the resume condition of the camera 11 of the fifth camera usage scene is satisfied is when it is predicted that it becomes the fifth camera usage scene.

Furthermore, the determination unit 3B performs the determination of whether the suspend condition of the camera 11 of the fifth camera usage scene is satisfied, in detail, the determination of whether the clearance sonar is in a non-operation condition (the OFF condition) in which the obstacle cannot be detected or the vehicle speed of the vehicle 1 is, for example, 20 km/h or more. When the suspend condition of the camera 11 of the fifth camera usage scene is satisfied, the control unit 3C switches the power supply of the camera 11 from ON to OFF. When the suspend condition of the camera 11 of the fifth camera usage scene is satisfied0 is when it is predicted that it is no longer the fifth camera usage scene.

In the fifth camera usage scene, the threshold value (15 km/h) of the vehicle speed for satisfying the resume condition is greater than the threshold value (10 km/h) of the vehicle speed for satisfying the operation condition and less than the threshold value (20 km/h) of the vehicle speed for satisfying the suspend condition.

In the first to fifth camera usage scenes, the video shot by the camera 11 is used for video display by, for example, the video display system (see FIG. 2), the MM (see FIG. 2) or the like.

Furthermore, the determination unit 3B performs the determination of whether the operation condition of a sixth camera usage scene is satisfied.

In the sixth camera usage scene, when a rear pedestrian of the vehicle 1 is detected by the camera 11, the rear pedestrian is automatically displayed on the MM (see FIG. 2) screen.

In the sixth camera usage scene, the determination unit 3B performs the determination of whether the operation condition of the camera 11 of the sixth camera usage scene is satisfied, in particularly, the determination of whether the vehicle speed of the vehicle 1 is, for example, 15 km/h or less, the shift lever is positioned in the R position, and the rear pedestrian is detected by the camera 11. When the operation condition of the camera 11 of the sixth camera usage scene is satisfied, the control unit 3C shoots by using the camera 11.

The determination unit 3B performs the determination of whether the resume condition of the camera 11 of the sixth camera usage scene is satisfied, in particular, the determination of whether the camera 11 is in a condition (for example, the condition in which a parking support brake is operable (the ON condition)) capable of detecting the rear pedestrian and the vehicle speed of the vehicle 1 is less than, for example, 20 km/h. When the resume condition of the camera 11 of the sixth camera usage scene is satisfied, the control unit 3C switches the power supply of the camera 11 from OFF to ON. When the resume condition of the camera 11 of the sixth camera usage scene is satisfied is when it is predicted that it becomes the sixth camera usage scene.

Furthermore, the determination unit 3B performs the determination of whether the suspend condition of the camera 11 of the sixth camera usage scene is satisfied, in detail, the determination of whether the camera 11 is in a condition (for example, the condition in which the parking support brake is inoperable (the OFF condition)) in which the rear pedestrian cannot be detected or the vehicle speed of the vehicle 1 is, for example, 25 km/h or more. When the suspend condition of the camera 11 of the sixth camera usage scene is satisfied, the control unit 3C switches the power supply of the camera 11 from ON to OFF. When the suspend condition of the camera 11 of the sixth camera usage scene is satisfied is when it is predicted that it is no longer the sixth camera usage scene.

In the sixth camera usage scene, the threshold value (20 km/h) of the vehicle speed for satisfying the resume condition is greater than the threshold value (15 km/h) of the vehicle speed for satisfying the operation condition and less than the threshold value (25 km/h) of the vehicle speed for satisfying the suspend condition.

The determination unit 3B performs the determination of whether the operation condition of a seventh camera usage scene is satisfied.

In the seventh camera usage scene, the video or the like shot by the camera 11 when the automatic parking of the vehicle 1 called advanced park is executed by the vehicle control device 19 is displayed on the MM (see FIG. 2) screen.

In the seventh camera usage scene, the determination unit 3B performs the determination of whether the operation condition of the camera 11 of the seventh camera usage scene is satisfied, in particular, the determination of whether the vehicle speed of the vehicle 1 is, for example, 15 km/h or less and whether the advanced park switch (a switch for starting the automatic parking) is pressed (that is, an advanced park function is ON). When the operation condition of the camera 11 of the seventh camera usage scene is satisfied, the control unit 3C shoots by using the camera 11.

The determination unit 3B performs the determination of whether the resume condition of the camera 11 of the seventh camera usage scene is satisfied, in particular, the determination of whether the advanced park function is in a condition to be able to turn ON (that is, the advanced park function is not in the OFF condition) and the vehicle speed of the vehicle 1 is less than, for example, 25 km/h. When the resume condition of the camera 11 of the seventh camera usage scene is satisfied, the control unit 3C switches the power supply of the camera 11 from OFF to ON. When the resume condition of the camera 11 of the seventh camera usage scene is satisfied is when it is predicted that it becomes the seventh camera usage scene.

Furthermore, the determination unit 3B performs the determination of whether the suspend state of the camera 11 of the seventh camera usage scene is satisfied, in particular, whether the advanced park function is in the OFF condition, for example, by the advanced park switch being pressed again during the execution of the automatic parking or the vehicle speed of the vehicle 1 is, for example, 30 km/h or more. When the suspend condition of the camera 11 of the seventh camera usage scene is satisfied, the control unit 3C switches the power supply of the camera 11 from ON to OFF. When the suspend condition of the camera 11 of the seventh camera usage scene is satisfied is when it is predicted that it is no longer the seventh camera usage scene.

In the seventh camera usage scene, the threshold value (25 km/h) of the vehicle speed for satisfying the resume condition is greater than the threshold value (15 km/h) of the vehicle speed for satisfying the operation condition and less than the threshold value (30 km/h) of the vehicle speed for satisfying the suspend condition.

In the sixth to seventh camera usage scenes, the video shot by the camera 11 is used, for example, for image recognition or the like by a recognition and detection system (see FIG. 2).

Specifically, in the example shown in FIG. 1, when one of the resume conditions of the camera 11 of the first to seventh camera usage scenes is satisfied, the control unit 3C switches the power supply of the camera 11 from OFF to ON.

In addition, when all of the suspend conditions of the camera 11 of the first to seventh camera usage scenes are satisfied, the control unit 3C switches the power supply of the camera 11 from ON to OFF.

In the example shown in FIG. 1, since the resume conditions of the camera 11 of the first to seventh camera usage scenes are set, transition time to the first to seventh camera usage scenes can be made equal to time when the camera 11 is always driven.

Figure 4:
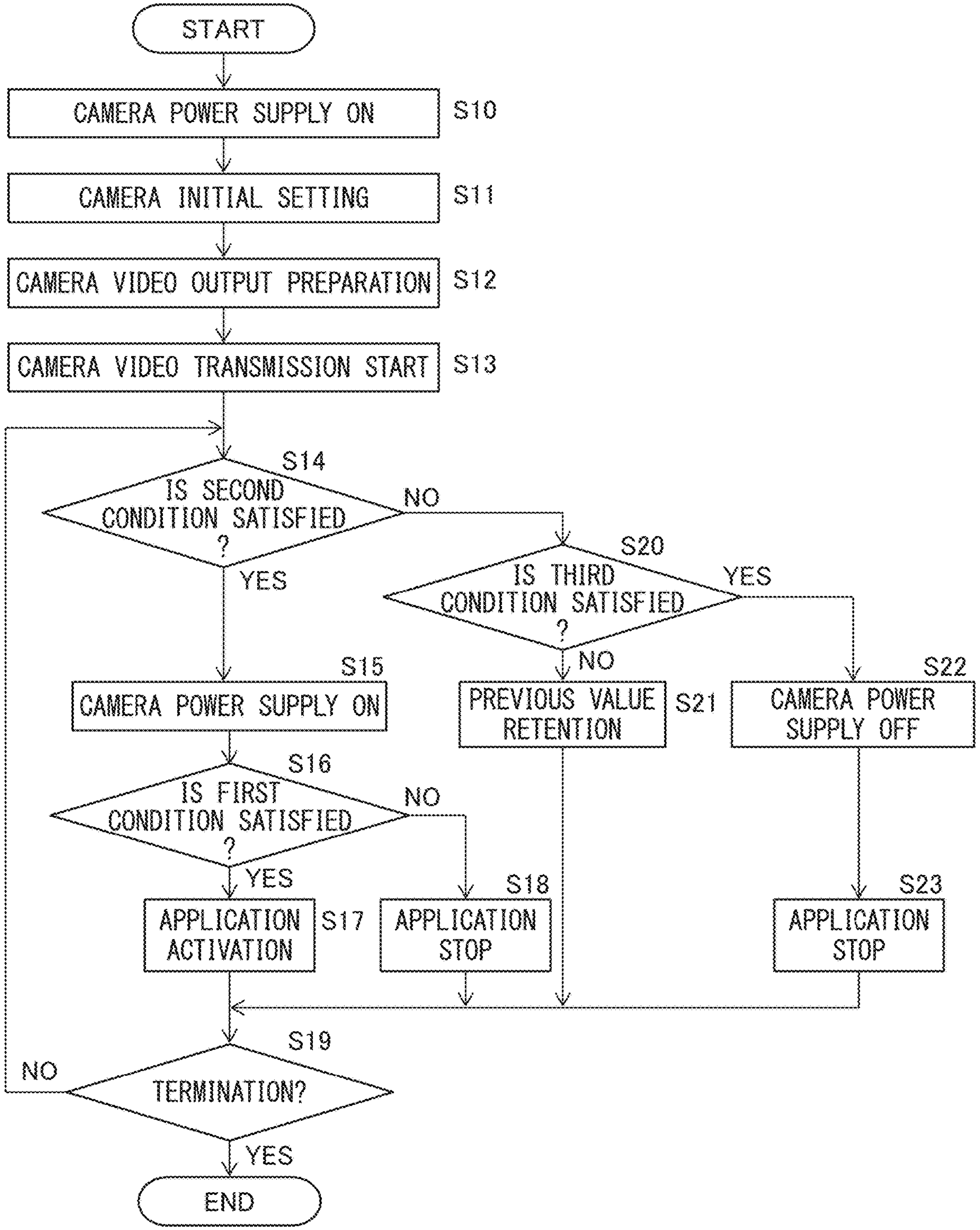
FIG. 4 is a flowchart for explaining an example of a process executed by a processor 183 of the camera control device 18 of the first embodiment.

FIG. 4 is a flowchart for explaining an example of a process executed by the processor 183 of the camera control device 18 of the first embodiment.

In the example shown in FIG. 4, at step S10, the control unit 3C turns ON the power supply of the camera 11.

At step S11, the control unit 3C executes an initial setup of the camera 11.

At step S12, the control unit 3C performs preparation of video output of the camera-11.

At step S13, the control unit 3C starts the video transmission of the camera-11.

At step S14 and step S20, prediction on the camera usage scene (prediction of becoming the camera usage scene and prediction of no longer being the camera usage scene) is performed.

Specifically, at step S14, the determination unit 3B performs the determination of whether the resume condition of the camera 11 of the camera usage scene (the second condition) is satisfied. In other words, the determination unit 3B predicts whether it becomes the camera usage scene. If YES, it proceeds to step S15, while if NO, it proceeds to step S20.

At step S15 to step S18, the camera 11 is in the resume condition.

Specifically, at step S15, the control unit 3C turns ON the power supply of the camera 11.

Specifically, when the power supply of the camera 11 is in the ON condition immediately before step S15 is executed, at step S15, the control unit 3C continues the ON condition of the power supply of the camera 11. When the power supply of the camera 11 is in the OFF condition immediately before step S15 is executed, at step S15, the control unit 3C switches the power supply of the camera 11 from OFF to ON.

At step S16, the determination unit 3B performs the determination of whether the operation condition of the camera 11 of the camera usage scene (the first condition) is satisfied. If YES, it proceeds to step S17, while if NO, it proceeds to step S18.

At step S17, the control unit 3C activates the application of the camera 11 or maintains an active state of the application of the camera 11.

At step S18, the control unit 3C stops the application of the camera 11 or maintains a stop state of the application of the camera 11.

At step S19, the determination unit 3B performs the determination of whether the process shown in FIG. 4 terminates. If YES (e.g., if the engine switch (or the power switch) is turned OFF), the process shown in FIG. 4 terminates, while if NO, it returns to step S14.

At step S20, the determination unit 3B performs the determination of whether the suspend condition of the camera 11 of the camera usage scene (the third condition) is satisfied. In other words, the determination unit 3B predicts whether it is no longer the camera usage scene. If YES, it proceeds to step S22, while if NO, it proceeds to step S21.

At step S21, the camera 11 is in a transient condition, and at step S22 to step S23, the camera 11 is in the suspend condition.

Specifically, at step S22, the control unit 3C turns OFF the power supply of the camera 11. Specifically, when the power supply of the camera 11 is in the OFF condition immediately before step S22 is executed, at step S22, the control unit 3C continues the OFF condition of the power supply of the camera 11. When the power supply of the camera 11 is in the ON condition immediately before step S22 is executed, at step S22, the control unit 3C switches the power supply of the camera 11 from ON to OFF.

At step S23, the control unit 3C stops the application of the camera 11 or maintains the stop state of the application of the camera 11.

In other words, in the example shown in FIG. 4, after the application of the camera 11 is stopped at step S18, when it is determined that the resume condition of the camera 11 of the camera usage scene is satisfied at step S14, the power supply of the camera 11 is switched (in advance) from OFF to ON at step S15 before it is determined that the operation condition of the camera 11 of the camera usage scene is satisfied at step S16. Therefore, it is possible to make the transition time to the camera usage scene equal to the case where the camera 11 is always driven. That is, it is possible to appropriately switch the power supply of the camera 11 from OFF to ON while reducing the power consumption of the camera 11.

Second Embodiment

The vehicle 1 to which the camera control device 18 of a second embodiment is applied has the same configuration as the vehicle 1 to which the camera control device 18 of the first embodiment described above is applied, except for the points to be described later.

As described above, the vehicle 1 to which the camera control device 18 of the first embodiment is applied has the function of using the camera 11 in all of the first to seventh camera usage scenes. On the other hand, the vehicle 1 to which the camera control device 18 of the second embodiment is applied has the function of using the camera 11 in one to six camera usage scenes among the first to seventh camera usage scenes.

Third Embodiment

The camera control device 18 and the camera 11 of a third embodiment are configured similarly to the camera control device 18 and the camera 11 of the first embodiment described above, except for the points to be described later.

As described above the camera control device 18 and the camera 11 of the first embodiment is mounted on the vehicle 1. On the other hand, the camera control device 18 and the camera 11 of the third embodiment is not mounted on the vehicle 1. The camera control device 18 and the camera 11 of the third embodiment is applicable to, for example, an ATM (Automatic Teller Machine) or the like.

In an example of the camera control device 18 and the camera 11 of the third embodiment, for example, the camera 11 is mounted on an ATM body, and when an ATM user enters an angle of view of the camera 11 corresponds to when the operation condition of the camera 11 of the camera usage scene is satisfied. When the ATM user who intends to enter a room in which the ATM is installed is detected by a human detection sensor outside an automatic door of exit and entrance of the room corresponds to when the resume condition of the camera 11 of the camera usage scene is satisfied. When the ATM user who intends to leave the room is detected by a human detection sensor inside the automatic door of the exit and the entrance of the room corresponds to when the suspend condition of the camera 11 of the camera usage scene is satisfied.

In another example of the camera control device 18 and camera 11 of the third embodiment, the camera 11 may be mounted on anything other than the ATM body.

As described above, although the embodiments of the camera control device, the camera control method, and the non-transitory recording medium of the present disclosure have been described with reference to the drawings, the camera control device, the camera control method, and the non-transitory recording medium of the present disclosure are not limited to the embodiments described above, and appropriate changes can be made without departing from the scope of the present disclosure. The configuration of each example of the embodiment described above may be appropriately combined. In each example of the above-described embodiments, the process performed in the camera control device 18 (ECU) has been described as software process performed by executing a program. However, the process performed in the camera control device 18 may be process performed by hardware. Alternatively, the process performed by the camera control device 18 may be a combination of both software and hardware. Further, the program (the program for realizing the function of the processor 183 of the camera control device 18) that is stored in the memory 182 of the camera control device 18 may be recorded in a computer-readable recording medium (non-transitory recording medium) such as, for example, a semiconductor memory, a magnetic recording medium, an optical recording medium, or the like to be provided and distributed.

The invention claimed is:

1. A camera control device comprising a processor configured to:

switch a power supply of a camera from OFF to ON when a second condition is satisfied, wherein when the second condition is satisfied in response to a determination that a scene in which the camera is predicted to be used will occur;

capture an image of the scene using the camera when a first condition is satisfied, wherein the first condition is different from the second condition;

switch the power supply of the camera from ON to OFF when a third condition is satisfied, wherein the third condition is satisfied in response to a determination that the scene in which the camera is used is predicted to no longer occur, and wherein the third condition differs from the first condition and the second condition, wherein the camera and the camera control device are mounted on a vehicle, a threshold value of vehicle speed for satisfying the second condition is greater than the threshold value of the vehicle speed for satisfying the first condition and less than the threshold value of the vehicle speed for satisfying the third condition, and the second condition is satisfied in response to the vehicle speed being less than 5 km/h prior to a shift lever of the vehicle being positioned in a position indicating reverse, and the first condition is satisfied in response to the shift lever being positioned in the position indicating reverse.

2. The camera control device according to claim 1, wherein the processor is configured to switch the power supply of the camera from OFF to ON before the first condition is satisfied.

3. A camera control method comprising:

switching a power supply of a camera from OFF to ON when a second condition is satisfied, wherein the second condition is satisfied in response to a determination that a scene in which the camera is predicted to be used will occur; and capturing an image of the scene using the camera when a first condition is satisfied, wherein the first condition is different from the second condition;

switching the power supply of the camera from ON to OFF when a third condition is satisfied, wherein the third condition is satisfied in response to a determination that the scene in which the camera is used is predicted to no longer occur, and wherein the third condition differs from the first condition and the second condition, wherein the camera is mounted on a vehicle, wherein a threshold value of vehicle speed for satisfying the second condition is greater than a threshold value of the vehicle speed for satisfying the first condition and less than a threshold value of the vehicle speed for satisfying the third condition, wherein the second condition is satisfied in response to the vehicle speed being less than 5 km/h prior to a shift lever of the vehicle being positioned in a position indicating reverse, and wherein the first condition is satisfied in response to the shift lever being positioned in the position indicating reverse.

4. The camera control method according to claim 3, wherein switching the power supply of the camera from OFF to ON occurs before the first condition is satisfied.

5. A non-transitory recording medium having recorded thereon a computer program for causing a processor to execute a process comprising:

switching a power supply of a camera from OFF to ON when a second condition is satisfied, wherein the second condition is satisfied in response to a determination that a scene in which the camera is predicted to be used will occur;

capturing an image of the scene using the camera when a first condition is satisfied, wherein the first condition is different from the second condition; and switching the power supply of the camera from ON to OFF when a third condition is satisfied, wherein the third condition is satisfied in response to a determination that the scene in which the camera is used is predicted to no longer occur, and wherein the third condition differs from the first condition and the second condition, wherein the camera is mounted on a vehicle, wherein a threshold value of vehicle speed for satisfying the second condition is greater than a threshold value of the vehicle speed for satisfying the first condition and less than a threshold value of the vehicle speed for satisfying the third condition, wherein the second condition is satisfied in response to the vehicle speed being less than 5 km/h prior to a shift lever of the vehicle being positioned in a position indicating reverse, and wherein the first condition is satisfied in response to the shift lever being positioned in the position indicating reverse.

6. The non-transitory recording medium according to claim 5, wherein switching the power supply of the camera from OFF to ON occurs before the first condition is satisfied.

* * * * *